US012122342B2

(12) United States Patent
Levi et al.

(10) Patent No.: US 12,122,342 B2
(45) Date of Patent: Oct. 22, 2024

(54) SYSTEMS AND METHODS FOR INTELLIGENTLY ENGAGING MULTIPLE BRAKES

(71) Applicant: Lyft, Inc., San Francisco, CA (US)

(72) Inventors: Dor Levi, San Francisco, CA (US); Carlos Ellis Whitt, San Francisco, CA (US); John Peter Walpole, New York, NY (US); Nicholaus Ian Lubinski, Fairfax, CA (US); Steven James Martisauskas, San Francisco, CA (US); Lucas Jon Van Houten, San Francisco, CA (US); Gregoire Ludovic Vincent Vandenbussche, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 937 days.

(21) Appl. No.: 16/541,829

(22) Filed: Aug. 15, 2019

(65) Prior Publication Data

US 2021/0046911 A1 Feb. 18, 2021

(51) Int. Cl.
*B60L 50/20* (2019.01)
*B60L 7/18* (2006.01)
(Continued)

(52) U.S. Cl.
CPC .............. *B60T 8/1706* (2013.01); *B60L 7/18* (2013.01); *B60T 8/18* (2013.01); *B60T 17/22* (2013.01);
(Continued)

(58) Field of Classification Search
CPC .......... B60T 8/1706; B60T 8/18; B60T 17/22; B60T 2210/124; B60T 2220/00;
(Continued)

(56) References Cited

U.S. PATENT DOCUMENTS 5,931,245 A * 8/1999 Uetake .................... B60L 50/66
180/65.8
9,744,952 B2 * 8/2017 Seto ......................... B62K 5/05
(Continued)

FOREIGN PATENT DOCUMENTS

EP 2149721 A1 * 2/2010 ............. F16D 66/02
EP 2570315 A1 * 3/2013 .......... B60L 15/2009
(Continued)

OTHER PUBLICATIONS

Cossalter_et_al_On_the_Braking_Behavior_of_Motorcycles_2004_University_of_Padova.*
(Continued)

*Primary Examiner* — Jelani A Smith
*Assistant Examiner* — George A Alcorn, III
(74) *Attorney, Agent, or Firm* — Baker Botts L.L.P.

(57) ABSTRACT

A system for multiple brakes intelligently controlled by a single brake input on a personal mobility vehicle. By determining a front and rear brake differential based on the position and weight of the rider as well as the environmental and vehicle conditions, the system may reduce the risk of the vehicle skidding or tipping due to over-braking. In some embodiments, a rider may use a single brake lever to indicate a desire to brake and the system may make determinations about how to apply a combination of mechanical and electrical brakes to front and back wheels. By applying different braking systems based on a combination of controls and sensors, the system may improve user experience and user safety, especially for inexperienced riders.

20 Claims, 13 Drawing Sheets

(51) Int. Cl.
*B60L 7/26* (2006.01)
*B60T 1/10* (2006.01)
*B60T 7/22* (2006.01)
*B60T 8/17* (2006.01)
*B60T 8/18* (2006.01)
*B60T 17/22* (2006.01)
*B62J 27/00* (2020.01)
*B62J 45/41* (2020.01)
*B62L 3/02* (2006.01)
*B62L 3/08* (2006.01)

(52) U.S. Cl.
CPC ............... *B62L 3/02* (2013.01); *B62L 3/08* (2013.01); *B60T 2210/124* (2013.01); *B60T 2220/00* (2013.01); *B60T 2230/03* (2013.01); *B60T 2250/00* (2013.01)

(58) Field of Classification Search
CPC ......... B60T 2230/03; B60T 2250/00; B60T 2201/022; B60T 1/10; B60T 7/22; B60T 8/261; B60L 7/18; B60L 3/0015; B60L 7/26; B60L 15/2018; B60L 50/20; B60L 2200/12; B60L 2240/642; B60L 2240/647; B60L 2240/667; B60L 2250/22; B62L 3/02; B62L 3/08; Y02T 10/64; Y02T 10/72; Y02T 90/16; B62J 27/00; B62J 45/41
USPC .......................................................... 701/70
See application file for complete search history.

(56) References Cited

U.S. PATENT DOCUMENTS

| | | | | |
|---|---|---|---|---|
| 10,029,683 | B1 * | 7/2018 | Ginther | B60W 30/09 |
| 10,248,129 | B2 * | 4/2019 | Reed | B60W 10/20 |
| 2004/0035630 | A1 * | 2/2004 | Lich | B60R 21/01516 |
| | | | | 701/45 |
| 2005/0146207 | A1 * | 7/2005 | Wagner | B60T 11/101 |
| | | | | 303/9.64 |
| 2006/0270527 | A1 * | 11/2006 | Hanaya | G09B 9/058 |
| | | | | 482/8 |
| 2010/0030490 | A1 * | 2/2010 | Wright | F16D 66/02 |
| | | | | 702/34 |
| 2013/0076113 | A1 * | 3/2013 | Pihl | B60W 20/14 |
| | | | | 303/3 |
| 2013/0211644 | A1 * | 8/2013 | Yokoyama | B60L 3/102 |
| | | | | 701/22 |
| 2015/0274018 | A1 * | 10/2015 | Crombez | B60L 7/18 |
| | | | | 701/22 |
| 2019/0126913 | A1 * | 5/2019 | Kinuhata | B60R 16/037 |
| 2020/0055501 | A1 * | 2/2020 | Corno | B60T 8/58 |
| 2022/0089244 | A1 * | 3/2022 | Froidevaux | B62L 3/00 |
| 2022/0161766 | A1 * | 5/2022 | Nose | B62L 3/00 |

FOREIGN PATENT DOCUMENTS

| | | | | |
|---|---|---|---|---|
| GB | 2563856 | A * | 1/2019 | B60L 7/18 |
| JP | H08254944 | A * | 10/1996 | |
| JP | 2000168672 | | * 6/2000 | |
| JP | 2000168672 | A * | 6/2000 | |
| JP | 2009078613 | A * | 4/2009 | |
| JP | 2013163422 | A * | 8/2013 | B60K 6/52 |
| JP | 2014000854 | A * | 1/2014 | |
| JP | 2017105224 | A * | 6/2017 | |
| JP | 2018165070 | A * | 10/2018 | |
| TW | 530016 | B * | 5/2003 | |
| WO | WO-9710967 | A1 * | 3/1997 | B60L 3/00 |
| WO | WO-2018083615 | A1 * | 5/2018 | B60T 11/165 |

OTHER PUBLICATIONS

Ed_Bargy_training_concept_Figure 7_Combined_CG_Force_Vector_ https://www.edbargy.net/training-tutorials-1/ lean-angle-centers-of-gravity-force-vectors.*

Cossalter et al., "On the Braking Behavior of Motorcycles," 2004, SAE International (Year: 2004).*

* cited by examiner

SYSTEMS AND METHODS FOR INTELLIGENTLY ENGAGING MULTIPLE BRAKES

BACKGROUND

Personal mobility vehicles, such as bicycles and scooters, are a popular means of transit. Traditionally, personal mobility vehicles have been individual owned and most commonly ridden by the owner. However, an increasing number of organizations offer short-term rentals of personal mobility vehicles, either as part of a longer trip facilitated by a transportation network or as a standalone method of transportation. In some cases, riders who are renting personal mobility vehicles may not have extensive experience riding vehicles of this type. This may be especially problematic if the vehicle in question is electrically assisted, such as an electric scooter or bicycle, which is capable of reaching higher speeds than a manually powered version of the same vehicle and therefore may be more dangerous or more difficult for an inexperienced operator. One of the most important operations for a rider of any vehicle to master is decreasing speed.

Traditional models of bicycles and scooters may have separate brake levers that each engage a brake on a different wheel. This system of levers may cause an inexperienced rider to engage brakes in a less than optimal way, resulting in skidding or tipping. Accordingly, the instant disclosure identifies and addresses a need for additional and improved systems and methods for intelligently engaging multiple brakes.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
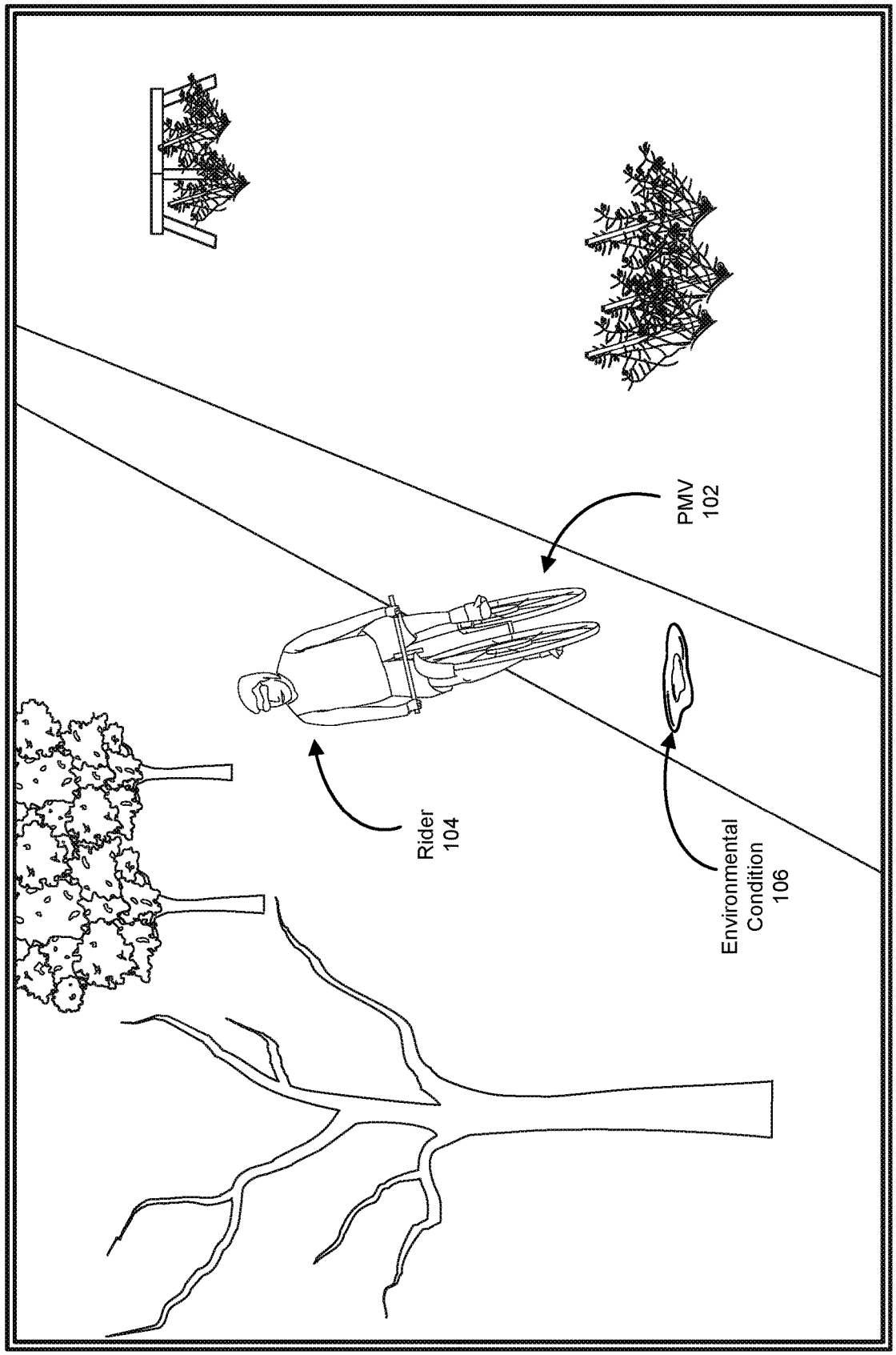
FIG. 1 is an illustration of an example personal mobility vehicle in environmental context relevant to braking.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a system for multiple brakes intelligently controlled by a single brake input on a personal mobility vehicle. An intelligently controlled braking system for a personal mobility vehicle may have a number of advantages. By determining a front and rear brake differential based on the position and weight of the rider as well as the environmental and vehicle conditions, the system may reduce the risk of the vehicle skidding or tipping due to over-braking. In some embodiments, the system may apply dynamic adjustment of the braking differential based on real-time braking performance. In some examples, the system may improve user safety by applying brakes based on object detection and/or reducing torque when encountering a situation that might necessitate a slowdown. In some embodiments, a rider may use a single brake lever to indicate a desire to brake and the system may make determinations about how to apply a combination of mechanical and electrical brakes to front and back wheels. In some embodiments, two brake levers may be available to a rider and the system may use various forms of feedback to indicate to the rider which lever to depress. In some instances, the system may apply a throttle and/or emergency brake rather than a normal brake. The system may sense when the vehicle is being wheeled rather than ridden (e.g., based on the lack of weight on the seat) and disengage the brakes. By applying different braking systems based on a combination of controls and sensors, the system may improve user experience and user safety, especially for inexperienced riders. Accordingly, as may be appreciated, the systems and methods described herein may provide advantages to personal mobility vehicles and/or the field of transportation by facilitating the safe use of personal mobility vehicles by inexperienced riders.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles that are not bound to traditional road lanes, such as scooters, bicycles, electric scooters, electric bicycles, and/or any other suitable type of personal mobility vehicle. In some embodiments, a dynamic transportation network may include autonomous vehicles (e.g., self-driving cars) that may be capable of operating with little or no input from a human operator.

FIG. 1 illustrates an example rider of a personal mobility vehicle (PMV) in environmental context relevant to braking. In one example, a rider 104 of a PMV 102 may encounter an environmental condition 106, such as a puddle, that prompts rider 104 to attempt to decelerate PMV 102. In some embodiments, PMV 102 may be equipped with multiple brakes, such as a front brake and a rear brake. In some examples, various different conditions of PMV 102 and/or rider 104 may affect the optimal way to apply brakes, such as the weight distribution of rider 104 relative to PMV 102 (e.g., more forward, more backward, centered), the current speed of PMV 102, the level of wear on the tires of PMV 102, and/or the current level of traction for the tires of PMV 102. If rider 104 is not experienced at operating PMV 102, rider 104 may not engage the brakes in an optimal way. For example, rider 104 may over-apply the front brake, causing PMV 102 to be at risk of tipping. In another example, rider 104 may over-apply both sets of brakes, causing PMV 102 to be at risk of losing traction and/or skidding. By intelligently engaging multiple brakes and/or indicating to rider 104 how to engage brakes, the systems described herein may improve the user experience and safety of rider 104.

Figure 2:
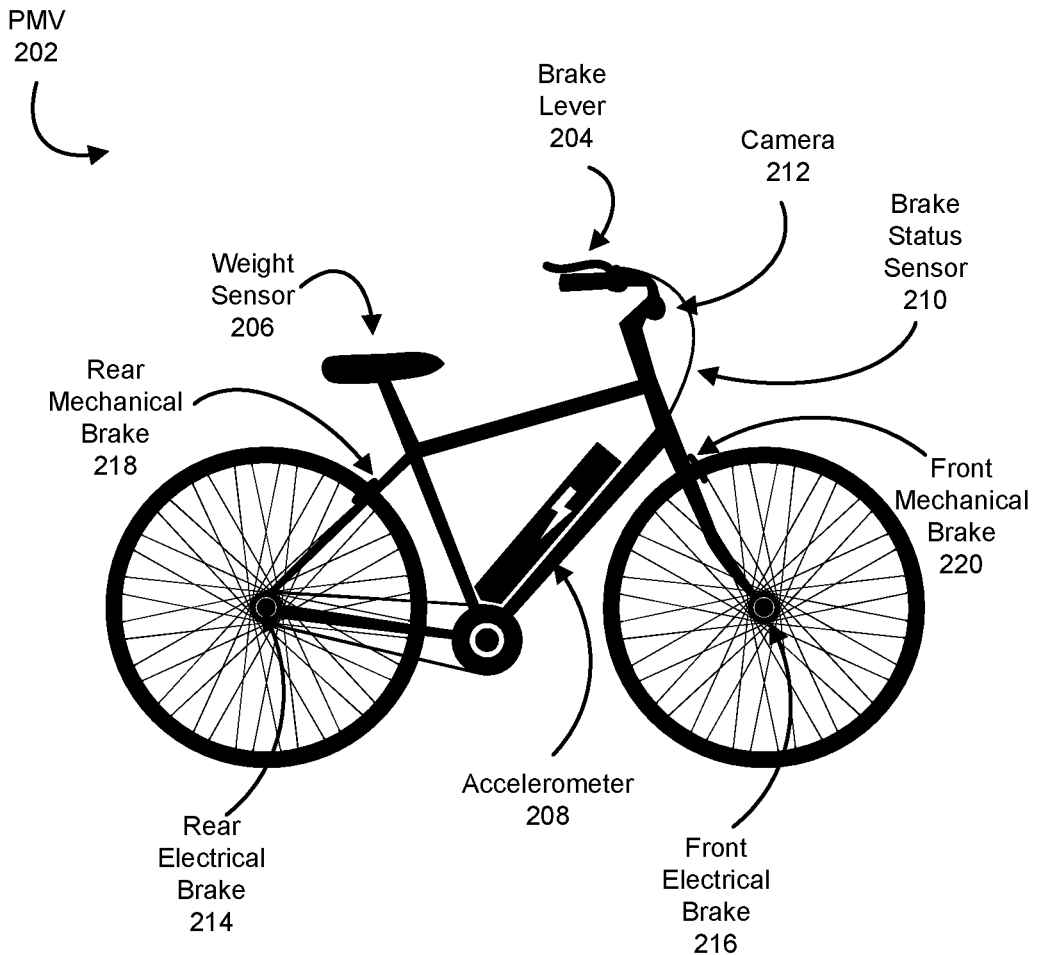
FIG. 2 is an illustration of an example personal mobility vehicle in context.

FIG. 2 illustrates an example PMV with multiple brakes. As illustrated in FIG. 2, a PMV 202 may have a brake lever 204 that a rider of PMV 202 can use to indicate a desire to decelerate PMV 202. The term "brake lever," as used herein, may refer to any type of physical mechanism that is capable of receiving input from a rider. In some embodiments, a brake lever receiver may be a physical lever that can be depressed to indicate a desire to brake. In one embodiment, a brake lever may capable of being depressed by varying amounts, indicating an intended level of engagement of one or more braking systems. In one embodiment, a brake lever may be directly connected to one or more brake systems (e.g., mechanical brakes). Alternatively, a brake lever may not be directly connected to the brakes but instead may be used by the systems described herein to detect whether the rider desires to decelerate. In some embodiments, the systems described herein may measure pressure on a brake lever and/or hydraulic fluid in a brake system to determine how forcefully a rider wishes to decelerate. In some embodiments, brake lever 204 may represent other types of input receivers, such as a button, a rotatable dial and/or grip, a switch, and/or a pressure sensor. In some embodiments, the systems described herein may initiate the application of brake force to one or more brakes in response to detecting input to the brake lever. The term "initiate," as used herein, may refer to increasing the application of force from zero (e.g., applying the brakes when previously the brakes were not being applied) and/or increasing the application of force over a previous level of force (e.g., applying the brakes more forcefully when the brakes are already being applied and/or modifying the level of brake force). Additionally or alternatively, the systems described herein may decrease the level of brake force applied in response to detecting decreased pressure on the brake lever.

In some embodiments, PMV 202 may be equipped with a weight sensor 206 that detects the weight and/or weight distribution of the rider, an accelerometer 208 that detects the speed and/or velocity of PMV 202, a brake status sensor 210 that detects the pressure of hydraulic fluid in the brake lines (e.g., to detect the current level of engagement of the mechanical brakes and/or a level of force being exerted onto brake lever 204), and/or a camera 212 that detects the presence of obstacles and/or environmental conditions that may necessitate a quick deceleration. In some embodiments, PMV 202 may be equipped with a rear electrical brake 214, front electrical brake 216, rear mechanical brake 218, and/or front mechanical brake 220. In some examples, front mechanical brake 218 and/or rear mechanical brake 220 may decelerate PMV 202 by applying pressure to a front or rear wheel of PMV 202, respectively, decreasing the speed of rotation of the wheel via an increase in friction. In some embodiments, front electrical brake 216 and/or rear electrical brake 214 may decelerate PMV 202 by applying pressure to a wheel and/or reducing power to a wheel. The term "brake," as used herein, may generally refer to any mechanism for reducing the velocity of a PMV. The term "brake force," as used herein, may generally refer to the speed with which a brake is engaged, the level of pressure that a brake applies to a wheel of a personal mobility vehicle, and/or the proportion of time within a time window that a brake is engaged versus disengaged (e.g., the frequency of application of an anti-lock brake system that alternately engages and disengages a brake).

Figure 3:
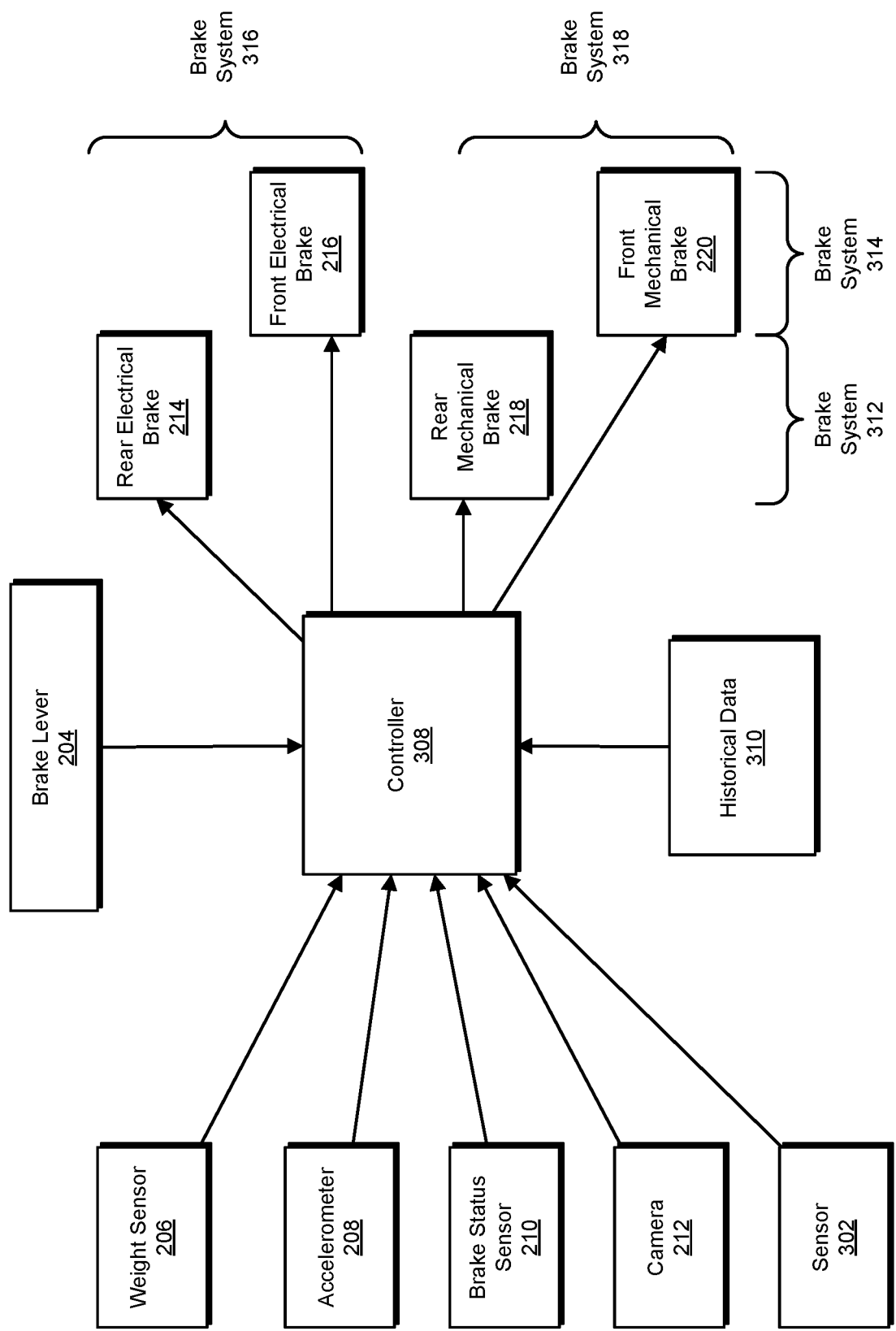
FIG. 3 is an illustration of an example system for intelligently engaging multiple brakes on a personal mobility vehicle.

FIG. 3 illustrates an example system for intelligently engaging multiple brakes. In some embodiments, a controller 308 may receive input from weight sensor 206, accelerometer 208, brake status sensor 210, and/or camera 212. Additionally or alternatively, controller 308 may receive input from an additional sensor 302 that may include a gyroscope, a location sensor (such as a global positioning system), a traction sensor, a wheel speed sensor, a radar, and/or any other type of suitable sensor that conveys information about a PMV, the rider of the PMV, and/or environmental conditions surrounding the PMV. In some embodiments, controller 308 may receive data from historical data 310. For example, historical data 310 may include information about how the current rider of the PMV has reacted to similar braking conditions in the past (e.g., the rider has over-applied the front brake in previous situations where the rider's weight is forward, creating a risk of tipping and/or the rider has historically applied brakes too slowly, increasing the risk of collision) and/or how riders of other PMVs associated with the dynamic transportation network have reacted to similar braking conditions.

In some embodiments, controller 308 may use any or all of this information to intelligently engage rear electrical brake 214, front electrical brake 216, rear mechanical brake 218, and/or front mechanical brake 220 in response to receiving input from brake lever 204. In some embodiments, rear electrical brake 214 and electrical brake 216 may form brake system 316 (i.e., the electrical brake system) and/or rear mechanical brake 218 and front mechanical brake 220 may form brake system 318 (i.e., the mechanical brake system). Additionally or alternatively, rear electrical brake 214 and rear mechanical brake 218 may form brake system 312 (i.e., the rear brake system) and/or front electrical brake 216 and front mechanical brake 220 may form brake system 314 (i.e., the front brake system). The term "brake system," as used herein, generally refers to any set of one or more brakes on a PMV. In some embodiments, controller 308 may engage different brake systems and/or different individual brakes with different levels of force and/or speed based on the information received from the sensors and/or historical data 310. In some embodiments, controller 308 may engage individual brakes and/or brake systems by determining a distribution differential for engaging the brakes and/or brake systems. The term "distribution differential," as used herein, refers to any situation where different brakes are engaged with various amounts of speed and/or force (including no force). For example, one distribution differential may engage brake system 312 and brake system 314 with equal force and speed, while a different distribution differential may engage brake system 312 with greater force and/or speed than brake system 314. In some examples, the systems described herein may calculate an uneven (i.e., between different brakes) distribution differential in order to reduce the risk of skidding and/or tipping under various conditions. For example, the systems described herein may engage brake system 314 with less force than brake system 312 in order to reduce the risk of tipping (e.g., of the front wheel locking up and causing the rider to fall off the bike). In one example, a distribution differential may engage brake system 312 at 30% of maximum force and brake system 314 at 10% of maximum force. In some embodiments, the systems described herein may increase brake force gradually over time rather than immediately applying all of the brake force intended for the current engagement of the brakes. In some examples, the engagement rates of the respective brakes may reflect a differential that corresponds to the overall braking differential. For example, a distribution differential may engage brake system 312 at 10% force per second up to the intended maximum force for the engagement and/or brake system 314 at 5% force per second. In some examples, controller 308 may engage different individual brakes with different levels of force and/or speed of application of force. In some embodiments, controller 308 may determine the distribution differential based at least in part on a condition affecting the PMV that is detected by one or more of the sensors. In some embodiments, brake lever 204 may be configured to apply a first brake force to brake system 314 and/or front mechanic brake 220 and/or a second brake force to brake system 312 and/or rear mechanical brake 218 and controller 308 may be configured to detect movement of the PMV based at least on applying the first brake force to brake system 314 and/or front mechanic brake 220 and the second brake force to brake system 312 and/or rear mechanical brake 218. In this embodiment, in response to the detected movement, controller 308 may modify the first brake force applied to brake system 314 and/or front mechanic brake 220 and/or the second brake force to brake system 312 and/or rear mechanical brake 218, where the first modified brake force differs from the second modified brake force.

Figure 4:
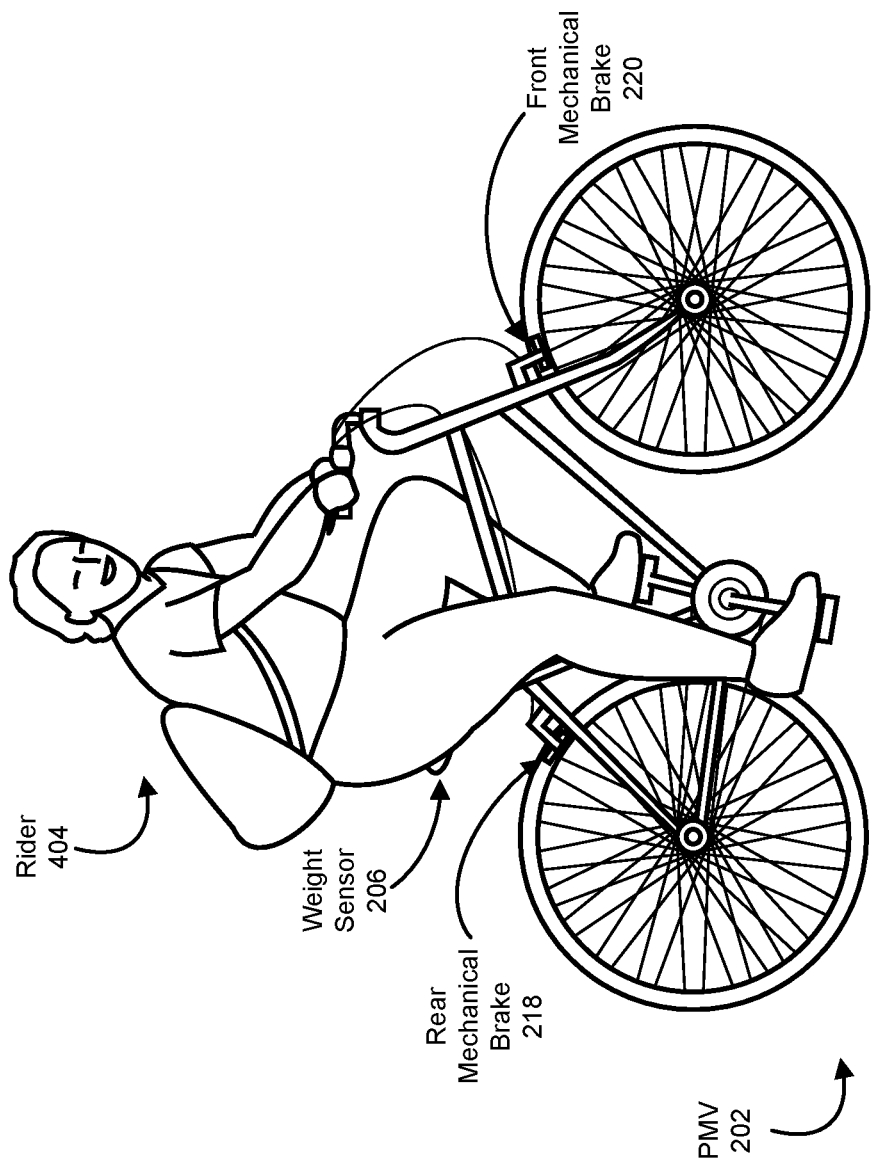
FIG. 4 is an illustration of an example personal mobility vehicle with a rider with an unequal weight distribution.

FIG. 4 illustrates an example rider of a PMV with an unequal weight distribution. In some examples, weight sensor 206 may detect that a rider 404 of PMV 202 has an unequal weight distribution relative to PMV 202, with more of the weight of rider 404 distributed towards the back of PMV 202 than towards the front of PMV 202. In some examples, unequal weight distribution may be caused by the position of rider 404 (e.g., leaning forward, leaning back, or sitting upright). Additionally or alternatively, unequal weight distribution may be caused by the body shape of rider 404. In some embodiments, the systems described herein may calculate a center of gravity of rider 404 to assist in determining braking distribution differential. In one example, the systems described herein may engage rear mechanical brake 218 less forcefully and/or front mechanical brake 220 more forcefully than if the weight of rider 404 were more centered relative to PMV 202. By decreasing the engagement of rear mechanical brake 218, the systems described herein may reduce the risk of the rear wheel of PMV 202 locking up (i.e., ceasing to rotate), causing skidding. Additionally or alternatively, the systems described herein may act to reduce skidding by pulsing rear mechanical brake 218 via repeatedly engaging rear mechanical brake 218 for a short period of time (e.g., half a second, one second, or two seconds) and then disengaging rear mechanical brake 218 for an equally short or shorter period of time. In some examples, the systems described herein may determine a distribution differential for the brakes based at least in part on the weight of rider 404. For example, the systems described herein may engage the brakes more strongly due to the increased force needed to decelerate a vehicle carrying more weight.

Figure 5:
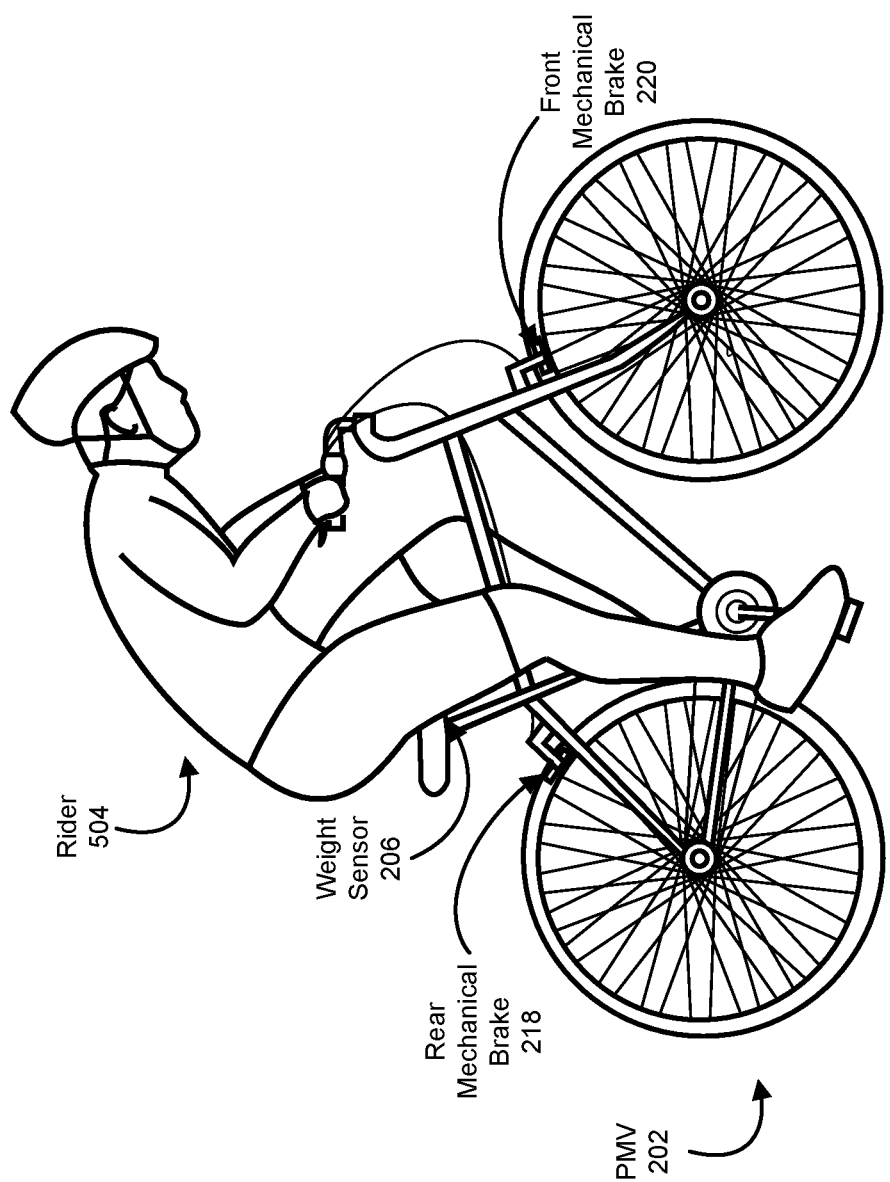
FIG. 5 is an illustration of an example personal mobility vehicle with a rider with an unequal weight distribution.

FIG. 5 illustrates an example rider of a PMV with an unequal weight distribution. In some examples, weight sensor 206 may detect that a rider 504 of PMV 202 has an unequal weight distribution relative to PMV 202, with more of the weight of rider 504 distributed towards the front of PMV 202 than towards the back of PMV 202. In one example, the systems described herein may engage rear mechanical brake 218 more forcefully and/or front mechanical brake 220 more forcefully than if the weight of rider 504 were more centered relative to PMV 202. By decreasing the engagement of front mechanical brake 220, the systems described herein may reduce the risk of the front wheel of PMV 202 locking up, causing skidding and/or tipping. Additionally or alternatively, the systems described herein may act to reduce skidding and/or tipping by pulsing front mechanical brake 220 in response to detecting that the weight distribution of rider 504 is forward of center.

Figure 6:
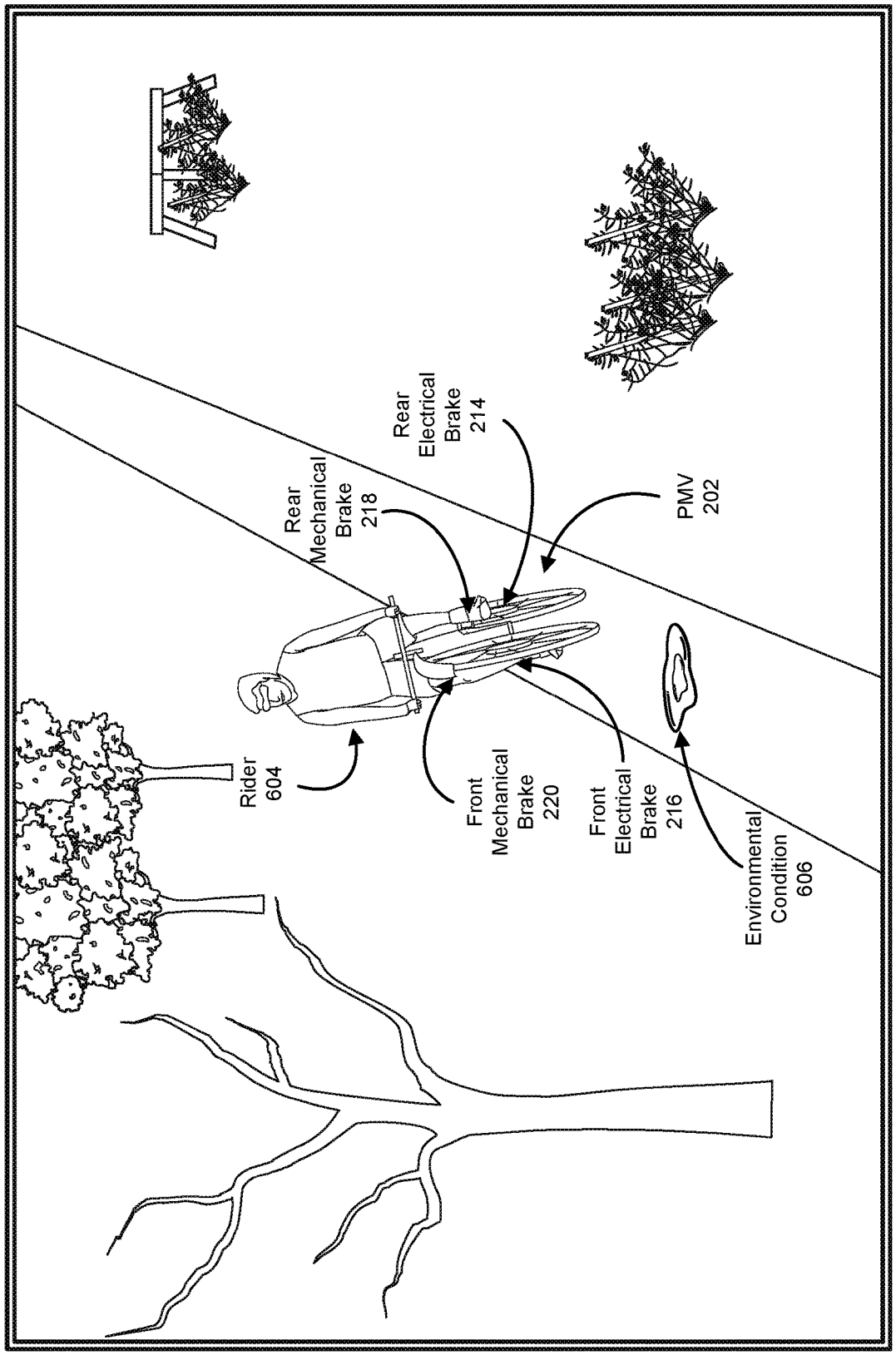
FIG. 6 is an illustration of an example personal mobility vehicle in environmental context relevant to braking.

FIG. 6 illustrates an example rider of a PMV in environmental context relevant to braking. In one example, a rider 604 of PMV 202 may encounter an environmental condition 606 that prompts rider 604 to attempt to decelerate PMV 202. In some examples, the systems described herein may engage various brakes and/or brake systems of PMV 202 based at least in part on conditions affecting PMV 202. For example, if the systems described herein detect that PMV 202 is moving downhill (e.g., via a gyroscope), the systems described herein may engage regenerative braking systems in front electrical brake 216 and/or rear electrical brake 214. In some embodiments, the systems described herein may reduce the engagement of the mechanical brake system when using regenerative braking and/or otherwise calculate a distribution differential between the mechanical and electrical braking systems based at least in part on the relevance of regenerative braking to the current situation. In some embodiments, in response to detecting that PMV 202 is moving downhill, the systems described herein may engage rear mechanical brake 218 more strongly than front mechanical brake 220 in order to reduce the risk of tipping. For example, the systems described herein may engage rear mechanical brake 218 at 40% of maximum force and/or front mechanical brake 220 at 10% of maximum force. In some examples, the systems described herein may detect a level of force relative to maximum force on the brake lever and may engage brakes at a proportional level of force. For example, the systems described herein may engage rear mechanical brake 218 at 20% and/or front mechanical brake 220 at 5% in response to detecting 20% force on the brake lever but may engage rear mechanical brake 218 at 60% and/or front mechanical brake 220 at 15% in response to detecting 60% force on the brake lever. In one embodiment, the systems described herein may reduce the throttle of PMV 202 to decelerate PMV 202 and/or reduce potentially unwanted acceleration of PMV 202 in response to detecting that PMV 202 is moving downhill. In some embodiments, the systems described herein may assist rider 604 in braking by using brake by wire via solenoid so that rider 604 is not reliant solely on manually exerting pressure on a lever to indicate the desired level of deceleration. In some embodiments, the systems described herein may default to prioritizing rear brakes, such as rear mechanical brake 218 and/or rear electrical brake 214, unless more deceleration is required by the situation than can be provided by the rear brakes and/or the conditions of the situation indicate that balanced and/or front braking is more optimal than rear braking.

Figure 7:
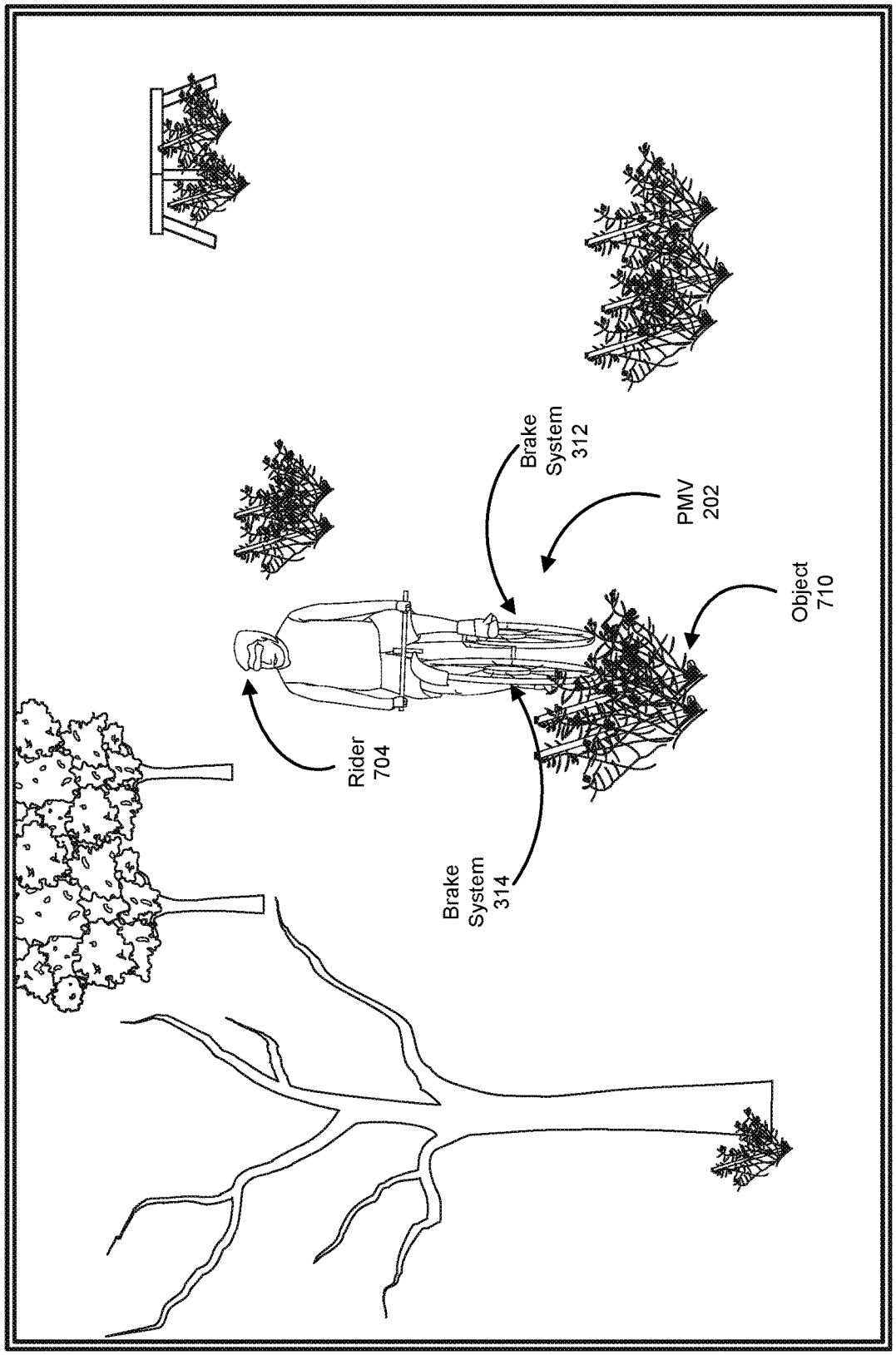
FIG. 7 is an illustration of an example personal mobility vehicle in environmental context relevant to braking.

FIG. 7 illustrates an example rider of a PMV in environmental context relevant to braking. In some examples, a rider 704 of PMV 202 may approach an object 710 that may be a collision hazard. In one example, rider 704 may attempt to decelerate PMV 202 before colliding with object 710. Additionally or alternatively, the systems described herein may automatically decelerate PMV 202 in response to detecting object 710 even in the absence of input from rider 704. In some examples, the systems described here may decelerate PMV 202 by reducing torque and/or power to an engine of PMV 202. In one embodiment, the systems described herein may apply an emergency brake (e.g., a brake that is not applied during manual deceleration and/or that is not applied during less abrupt deceleration) in response to detecting a potential collision with object 710. In some embodiments, the systems described herein may determine how quickly and/or strongly to engage brake system 312 and/or brake system 314 at least in part based on information such as the current speed of PMV 202 (e.g., as measured by an accelerometer), the distance between PMV 202 and object 710 (e.g., as detected by a camera), the weight distribution of rider 704, the level of traction of the riding surface, and/or other factors. For example, the systems described herein may determine, based on the distance between PMV 202 and object 710 and the speed of PMV 202, to engage braking systems 312 and/or 314 strongly but, based on the low traction of the riding surface, to pulse brake systems 312 and/or 314 to avoid skidding. In some embodiments, the systems described herein may decelerate less quickly (e.g., to reduce the risk of tipping) when no potential collision is detected than when a potential collision is detected.

In some examples, if one wheel loses traction but not the other, the systems described herein may increase the engagement of the brakes on the wheel that continues to have traction. For example, if the systems described herein detect that the front wheel has low or no traction, the systems described herein may increase the engagement of brake system 312 on the rear wheel. Similarly, if the systems described herein determine that the rear wheel has less traction than the front wheel, the systems described herein may increase the engagement of brake system 314 to compensate. In some examples, the systems described herein may include one or more sensors that detect multiple types of environmental conditions relevant to traction, such as type of riding surface (e.g., paved, gravel, dirt, and/or grass) and/or weather (e.g., rain). Additionally or alternatively, the systems described herein may retrieve environmental condition data, such as weather data, from an external server. For example, the systems described herein may use a weather forecast database to determine that it has rained within the past several hours and thus the riding surface is likely to be wet.

In some embodiments, the systems described herein may monitor the condition of one or more components of the PMV. For example, the systems described herein may detect that the front wheel tire is worn (e.g., has low and/or uneven tread depth) and thus likely to have worse traction than the rear wheel tire. In some embodiments, the systems described herein may detect tire wear by tracking when PMV 202 is equipped with new tires and estimating tire wear based on the distance traveled with the current tires, the types of terrain detected, the load carried by PMV 202, and/or any other relevant factors. In one example, the systems described herein may increase the engagement of rear mechanical brake 218 and/or rear electrical brake 214 to compensate for the expected low traction of the worn front tire. Additionally or alternatively, the systems described herein may pulse front mechanical brake 220 and/or front electrical brake 216 in response to detecting that the front tire is worn.

In some embodiments, the systems described herein may apply dynamic adjustment of the braking differential based on real-time braking performance. For example, if the systems described herein determine that the PMV is not decelerating as predicted (e.g., due to lower-than-expected traction and/or any other relevant factor), the systems described herein may engage the brakes more forcefully, pulse the brakes, and/or change the distribution differential of the brakes and/or brake systems. In another example, if the systems described herein determine that the PMV is in danger of tipping (e.g., based on information from a gyroscope and/or a rider weight distribution sensor), the systems described herein may shift the distribution differential to emphasize the rear brakes. Additionally or alternatively, if the systems described herein determine that the PMV is in danger of skidding, the systems described herein may increase engagement of the front brakes and/or pulse one or more sets of brakes.

Figure 8:
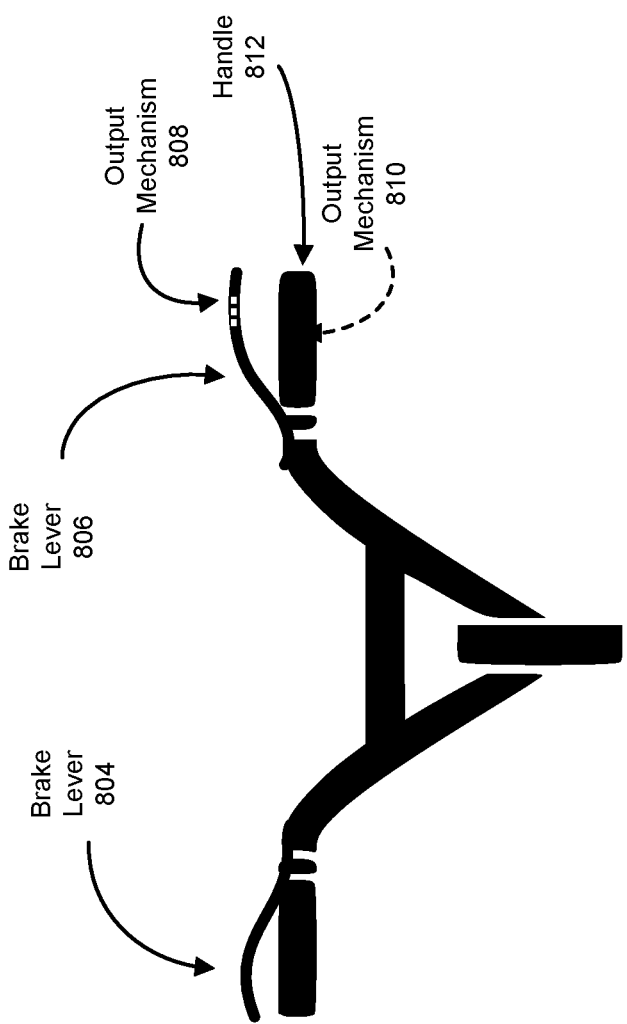
FIG. 8 is an illustration of example brake indicators on a personal mobility vehicle.

FIG. 8 illustrates example brake indicators on a PMV. In one embodiment, a PMV may have multiple brake levers, such as brake lever 804 and brake lever 806. In some embodiments, different brake levers may send input to different brake systems. For example, brake lever 804 may send input to brake system 314 and/or brake lever 806 may send input to brake system 312. In one embodiment, the systems described herein may determine which brake system to engage and/or which brake system to engage more strongly than the other brake system (e.g., by determining a distribution differential between brake systems) and may indicate to a rider of the PMV which brake lever to use. For example, an output mechanism 808 on brake lever 806 may include lights (e.g., light-emitting diodes) that light up when the systems described herein determine that the rider should use brake lever 806 to engage brake system 312. Additionally or alternatively, an output mechanism 810 within a handle 812 may include haptic feedback (e.g., vibration) that indicates that the rider should use brake lever 806. In some examples, brake lever 804 may be equipped with similar output mechanisms. By using the output mechanism to indicate which brake system or systems to apply, the systems described herein may increase a rider's level of proficiency with operating a PMV and/or may improve rider safety.

In some embodiments, the systems described herein may use additional output mechanisms to indicate that a rider of a PMV may need to decelerate the PMV. For example, the systems described herein may temporarily pause an audio feed (e.g., music and/or navigational instructions) to indicate that the rider may wish to be alert for potential hazards that may require deceleration. In some embodiments, the systems described herein may pause the audio feed in reaction to ambient sounds (e.g., the sound of a nearby car), nearby objects detected by a camera, and/or other indications of potential hazards. Additionally or alternatively, the systems described herein may reduce the maximum torque and/or power available to the PMV in response to detecting potential nearby hazards and/or the potential need to decelerate.

Figure 9B:
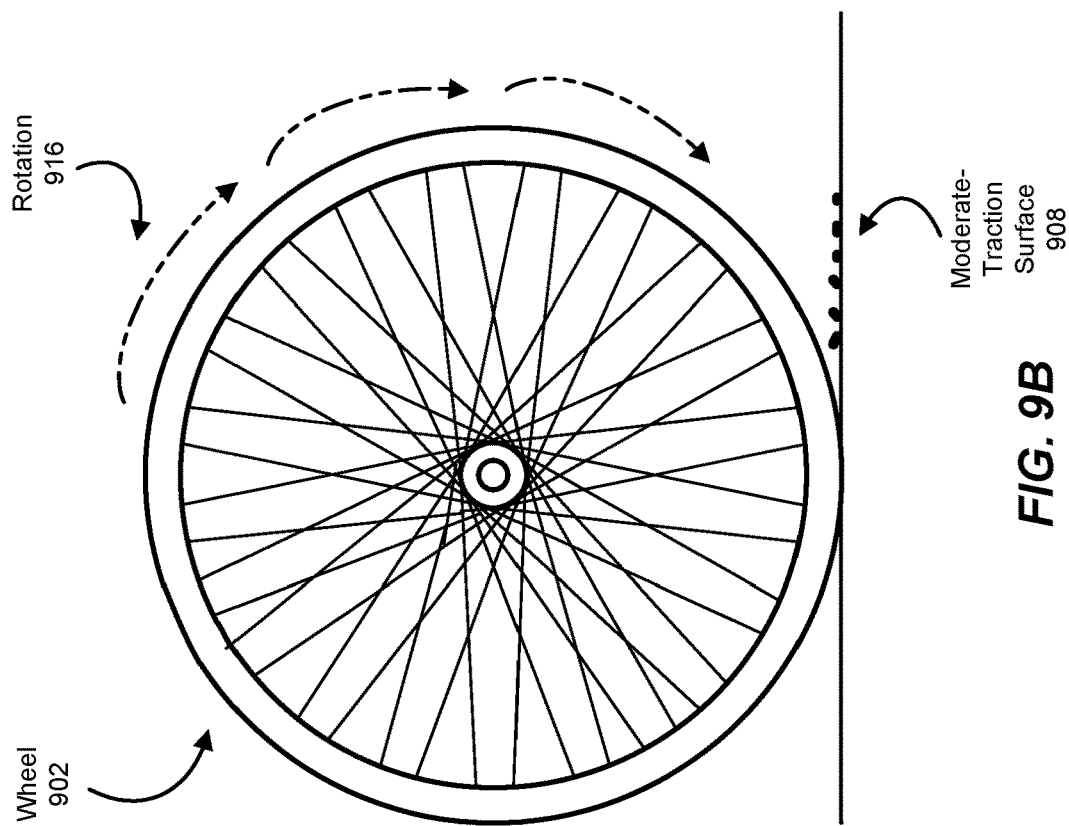
FIGS. 9A and 9B are illustrations of an example anti-lock braking system for a personal mobility vehicle.
Figure 9A:
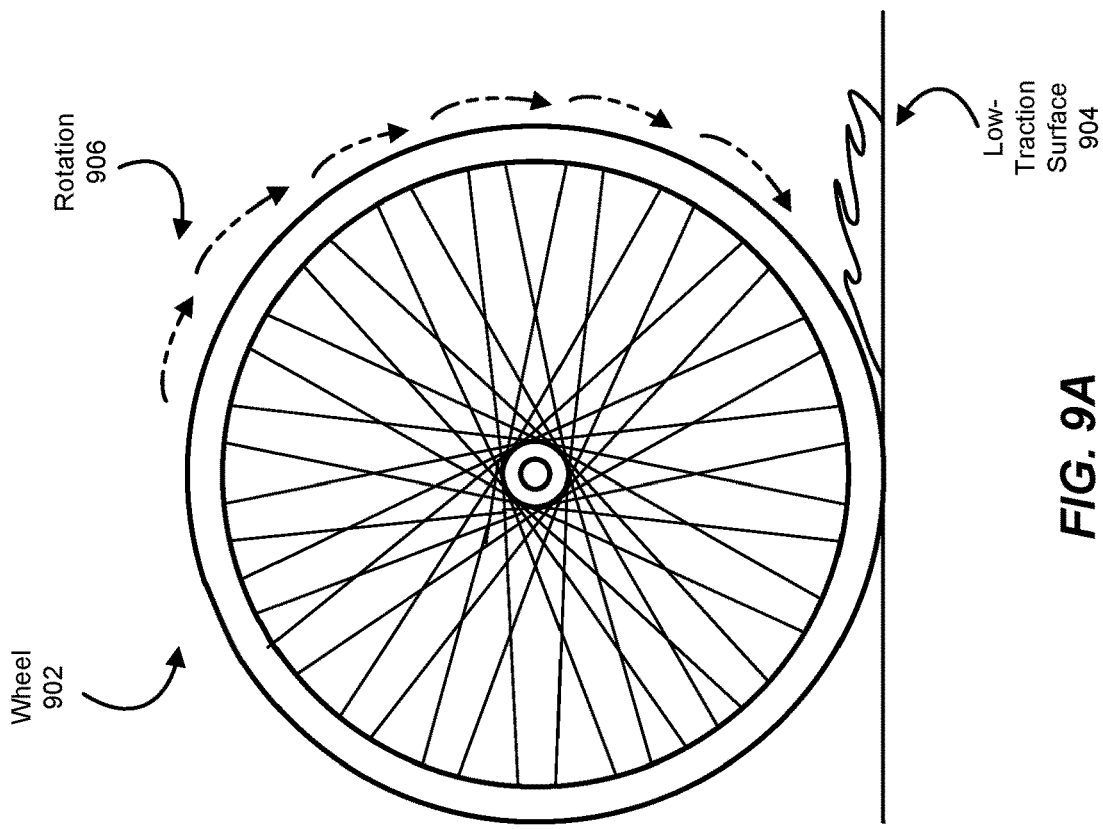

FIGS. 9A and 9B illustrate an example anti-lock braking system for a PMV. In some examples, as illustrated in FIG. 9A, a wheel 902 of a PMV may encounter a low-traction surface 904 such as gravel, grass, loose dirt, water, ice, and/or any other type of surface with poor traction. In one embodiment, rotation 906 of wheel 902 may be periodically interrupted by the application of a brake. In some embodiments, an anti-lock braking system may alternately engage and disengage one or more brakes to slow down a PMV without causing the wheels to lock up and skid, slide, and/or hydroplane. For example, the anti-lock braking system may engage and disengage the brakes fifteen times per second. Additionally or alternatively, the anti-lock braking system may engage and disengage the brakes five times a second, ten times a second, twenty times a second, and/or any other suitable number of times. In one embodiment, the systems described herein may calculate a frequency for the engage-disengage cycle of the anti-lock brake system (e.g., a frequency of the application and cessation of application of brake force to the front and/or rear brake) based on one or more braking-related conditions such as surface traction, rider weight distribution, tire tread wear, previous rider braking behavior, and/or other conditions. In some examples, the systems described herein may calculate a shorter engage-disengage cycle and/or an engage-disengage cycle with less brake engagement time than otherwise in response to detecting lower traction conditions and/or may calculate a longer engage-disengage cycler and/or an engage-disengage cycle with more brake engagement time in response to detecting higher traction conditions. For example, as illustrated in FIG. 9B, wheel 902 may encounter a moderate-traction surface 908 such as loose rocks and the systems described herein may determine an anti-lock braking frequency that results in a rotation 916. In one example, when wheel 902 encounters low-traction surface 904, the systems described herein may engage brakes 15 times per second, while when wheel 902 encounters moderate-traction surface 908, the systems described herein may engage brakes 8 times per second.

Figure 10:
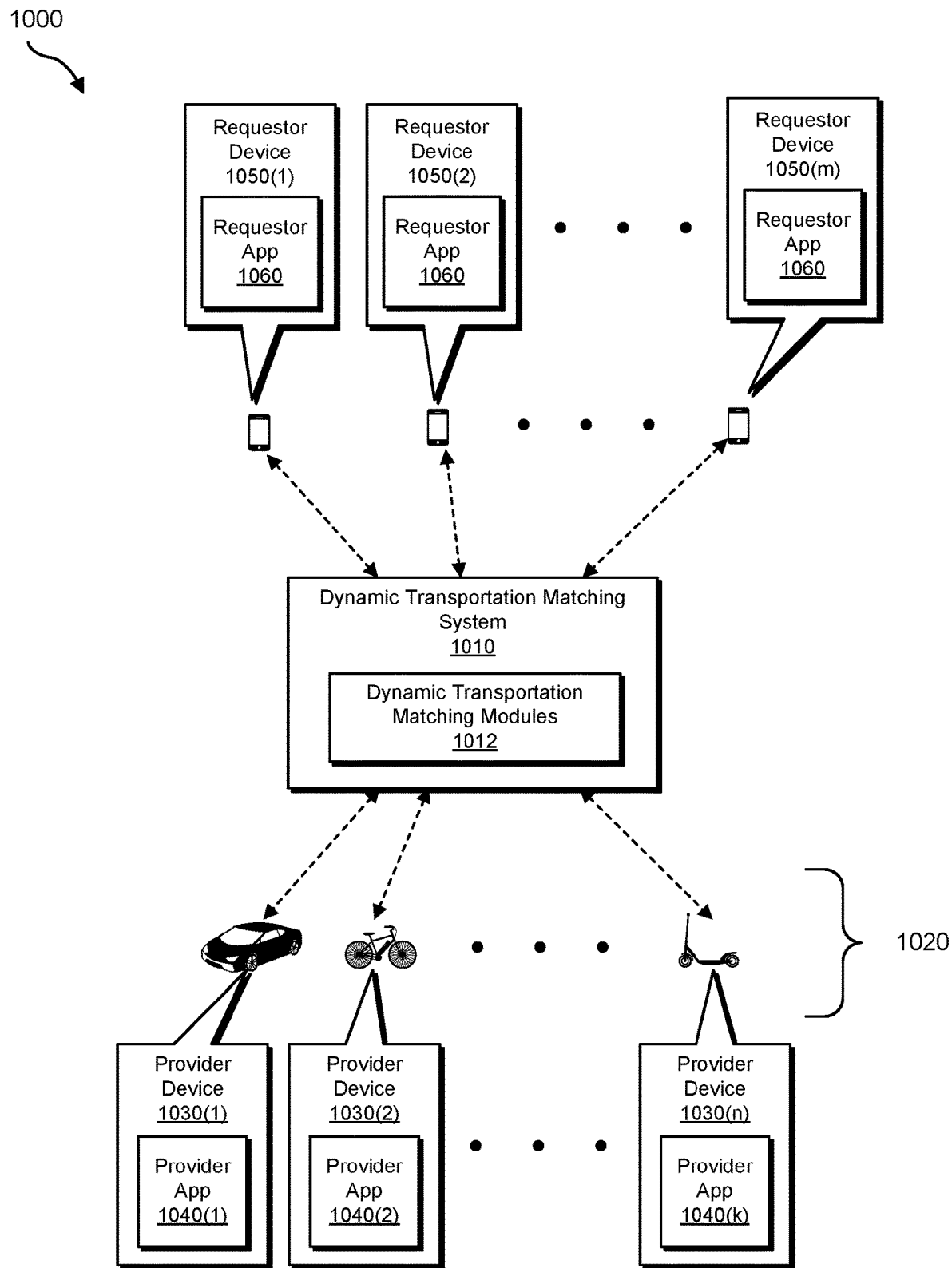
FIG. 10 is a block diagram of an example system for matching transportation requests with a dynamic transportation network that includes personal mobility vehicles.

FIG. 10 illustrates an example system 1000 for matching transportation requests with a dynamic transportation network that includes PMVs. As shown in FIG. 10, a dynamic transportation matching system 1010 may be configured with one or more dynamic transportation matching modules 1012 that may perform one or more of the steps described herein. Dynamic transportation matching system 1010 may represent any computing system and/or set of computing systems capable of matching transportation requests. Dynamic transportation matching system 1010 may be in communication with computing devices in each of a group of vehicles 1020. Vehicles 1020 may represent any vehicles that may fulfill transportation requests. In some examples, vehicles 1020 may include disparate vehicle types and/or models. For example, vehicles 1020 may include road-going vehicles and PMVs. In some examples, some of vehicles 1020 may be standard commercially available vehicles. According to some examples, some of vehicles 1020 may be owned by separate individuals (e.g., transportation providers). Furthermore, while, in some examples, many or all of vehicles 1020 may be human-operated, in some examples many of vehicles 1020 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 10 does not specify the number of vehicles 1020, it may be readily appreciated that the systems described herein are applicable to hundreds of vehicles, thousands of vehicles, or more. In one example, dynamic transportation matching system 1010 may coordinate transportation matchings within a single region for 50,000 vehicles or more on a given day. In some examples, vehicles 1020 may collectively form a dynamic transportation network that may provide transportation supply on an on-demand basis to transportation requestors.

As mentioned above, dynamic transportation matching system 1010 may communicate with computing devices in each of vehicles 1020. The computing devices may be any suitable type of computing device. In some examples, one or more of the computing devices may be integrated into the respective vehicles 1020. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1010.

As shown in FIG. 10, vehicles 1020 may include provider devices 1030(1)-(n) (e.g., whether integrated into the vehicle, permanently affixed to the vehicle, temporarily affixed to the vehicle, worn by a driver of the vehicle, etc.). In some examples, provider devices 1030 may include a provider apps 1040(1)-(k). Provider apps 1040(1)-(k) may represent any application, program, and/or module that may provide one or more services related to operating a vehicle and/or providing transportation matching services. For example, provider apps 1040(1)-(k) may include a transportation matching application for providers and/or one or more applications for matching PMVs (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1040(1)-(*k*) may match the user of provider apps 1040(1)-(*k*) (e.g., a transportation provider) with transportation requestors through communication with dynamic transportation matching system 1010. In addition, and as is described in greater detail below, provider apps 1040(1)-(*k*) may provide dynamic transportation management system 1010 with information about a provider (including, e.g., the current location of the provider and/or vehicle) to enable dynamic transportation management system 1010 to provide dynamic transportation matching and/or management services for the provider and one or more requestors. In some examples, provider apps 1040(1)-(*k*) may coordinate communications and/or a payment between a requestor and a provider. According to some embodiments, provider apps 1040(1)-(*k*) may provide a map service, a navigation service, a traffic notification service, and/or a geolocation service.

Additionally, as shown in FIG. 10, dynamic transportation matching system 1010 may communicate with requestor devices 1050(1)-(m). In some examples, requestor devices 1050 may include a requestor app 1060. Requestor app 1060 may represent any application, program, and/or module that may provide one or more services related to requesting transportation matching services. For example, requestor app 1060 may include a transportation matching application for requestors. In some examples, requestor app 1060 may match the user of requestor app 1060 (e.g., a transportation requestor) with transportation providers through communication with dynamic transportation matching system 1010. In addition, and as is described in greater detail below, requestor app 1060 may provide dynamic transportation management system 1010 with information about a requestor (including, e.g., the current location of the requestor) to enable dynamic transportation management system 1010 to provide dynamic transportation matching services for the requestor and one or more providers. In some examples, requestor app 1060 may coordinate communications and/or a payment between a requestor and a provider. According to some embodiments, requestor app 1060 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a PMV service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 11:
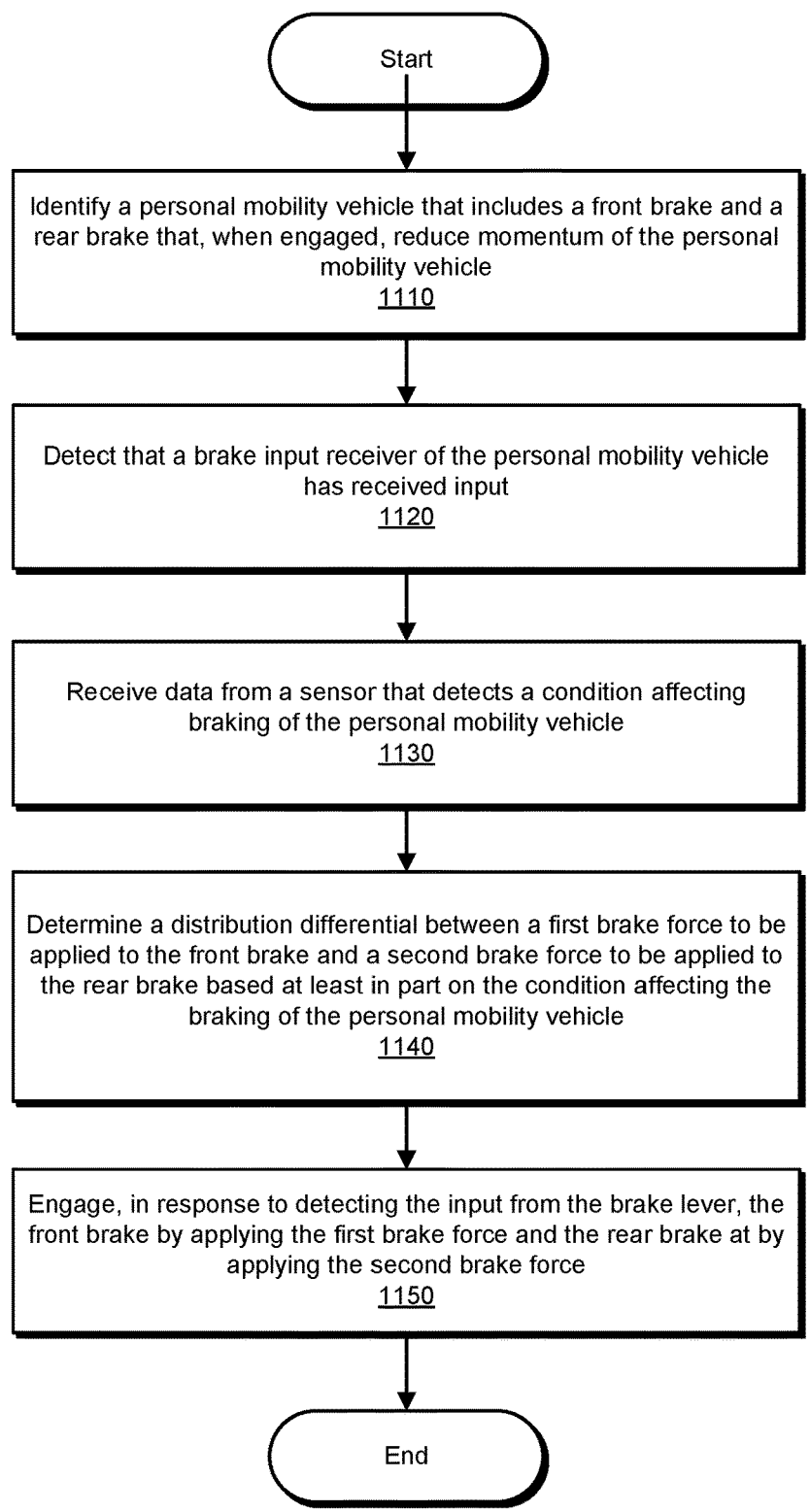
FIG. 11 is a flow diagram of an example method for intelligently engaging multiple brakes.

FIG. 11 illustrates an example computer-implemented method 1100 for intelligently applying brakes. As shown in FIG. 11, at step 1110, one or more of the systems described herein may identify a PMV that includes a front brake and a rear brake that, when engaged, reduce momentum of the PMV. At step 1120, one or more of the systems described herein may detect that a brake lever of the PMV has received input. At step 1130, one or more of the systems described herein may receive data from a sensor that detects a condition affecting braking of the PMV. In some examples, the condition affecting braking of the PMV may include a weight distribution of the rider of the PMV.

At step 1140, one or more of the systems described herein may determine a distribution differential between a first brake force to be applied to the front brake and a second brake force to be applied to the rear brake based at least in part on the condition affecting the braking of the PMV. In one example, the systems described herein may receive data from the sensor that indicates a lack of pressure on a rider-supporting portion of the PMV and disengage the brake systems (e.g., the front brake and the rear brake) in response to receiving the data from the sensor that indicates the lack of pressure on the rider-supporting portion (e.g., the seat of a bicycle or the deck of a scooter) of the PMV. By disengaging the brakes when the weight sensor indicates a lack of pressure, the systems described herein may decrease the difficulty of wheeling a PMV from one location to another (e.g., by walking beside the PMV while not riding the PMV). In some embodiments, the systems describe herein may reduce the engagement of the brake systems but not disengage the brake systems entirely. For example, when a PMV is being wheeled downhill, the systems described herein may engage a minimal level of brake systems prevent the force of gravity from pulling the PMV downhill faster than comfortable walking pace.

In some examples, determining the distribution differential between the front brake and the rear brake may include receiving information from the sensor that indicates a probability of the PMV tipping over and increasing an engagement of the rear brake based at least in part on receiving the information from the sensor that indicates the probability of the PMV tipping over. In one example, receiving the data from the sensor that detects the condition affecting braking of the PMV may include receiving data about an object towards which the PMV is moving, and determining how to engage the at least two brake systems may include making a determination to engage the at least two brake systems with a specified amount of speed in response to receiving the data about the object towards which the PMV is moving. In some embodiments, at step 1150, the systems described herein may engage, in response to detecting the input from the brake lever, the front brake by applying the first brake force and the rear brake by applying the second brake force.

Figure 12:
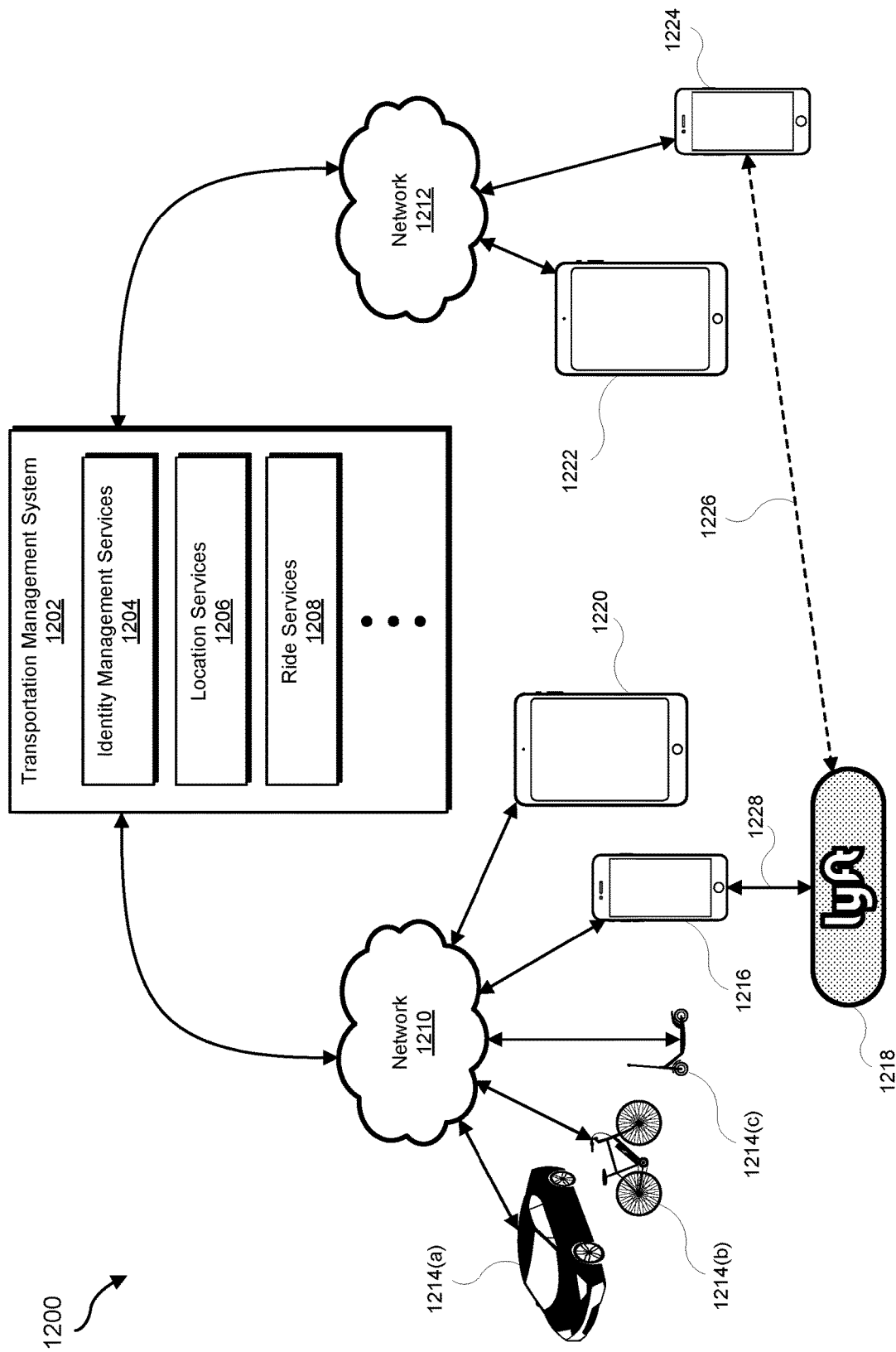
FIG. 12 is an illustration of an example requestor/provider management environment.

FIG. 12 shows a transportation management environment 1200, in accordance with various embodiments. As shown in FIG. 12, a transportation management system 1202 may run one or more services and/or software applications, including identity management services 1204, location services 1206, ride services 1208, and/or other services. Although FIG. 12 shows a certain number of services provided by transportation management system 1202, more or fewer services may be provided in various implementations. In addition, although FIG. 12 shows these services as being provided by transportation management system 1202, all or a portion of any of the services may be processed in a distributed fashion. For example, computations associated with a service task may be performed by a combination of transportation management system 1202 (including any number of servers, databases, etc.), one or more devices associated with a provider (e.g., devices integrated with managed vehicles 1214(a), 1214(b), and/or 1214(c); provider computing devices 1216 and tablets 1220; and transportation management vehicle devices 1218), and/or more or more devices associated with a ride requestor (e.g., the requestor's computing devices 1224 and tablets 1222). In some embodiments, transportation management system 1202 may include one or more general purpose computers, server computers, clustered computing systems, cloud-based computing systems, and/or any other computing systems or arrangements of computing systems. Transportation management system 1202 may be configured to run any or all of the services and/or software components described herein. In some embodiments, the transportation management system 1202 may include an appropriate operating system and/or various server applications, such as web servers capable of handling hypertext transport protocol (HTTP) requests, file transfer protocol (FTP) servers, database servers, etc.

In some embodiments, identity management services 1204 may be configured to perform authorization services for requestors and providers and/or manage their interactions and/or data with transportation management system 1202. This may include, e.g., authenticating the identity of providers and determining that they are authorized to provide services through transportation management system 1202. Similarly, requestors' identities may be authenticated to determine whether they are authorized to receive the requested services through transportation management system 1202. Identity management services 1204 may also manage and/or control access to provider and/or requestor data maintained by transportation management system 1202, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1202 may also manage and/or control access to provider and/or requestor data stored with and/or obtained from third-party systems. For example, a requester or provider may grant transportation management system 1202 access to a third-party email, calendar, or task management system (e.g., via the user's credentials). As another example, a requestor or provider may grant, through a mobile device (e.g., 1216, 1220, 1222, or 1224), a transportation application associated with transportation management system 1202 access to data provided by other applications installed on the mobile device. In some examples, such data may be processed on the client and/or uploaded to transportation management system 1202 for processing.

In some embodiments, transportation management system 1202 may provide ride services 1208, which may include ride matching and/or management services to connect a requestor to a provider. For example, after identity management services module 1204 has authenticated the identity a ride requestor, ride services module 1208 may attempt to match the requestor with one or more ride providers. In some embodiments, ride services module 1208 may identify an appropriate provider using location data obtained from location services module 1206. Ride services module 1208 may use the location data to identify providers who are geographically close to the requestor (e.g., within a certain threshold distance or travel time) and/or who are otherwise a good match with the requestor. Ride services module 1208 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1208 may use rule-based algorithms and/or machine-learning models for matching requestors and providers.

Transportation management system 1202 may communicatively connect to various devices through networks 1210 and/or 1212. Networks 1210 and 1212 may include any combination of interconnected networks configured to send and/or receive data communications using various communication protocols and transmission technologies. In some embodiments, networks 1210 and/or 1212 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1210 and/or 1212 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 1002.12 family of standards, Bluetooth, Bluetooth Low Energy, Near Field Communication (NFC), Z-Wave, and ZigBee). In various embodiments, networks 1210 and/or 1212 may include any combination of networks described herein or any other type of network capable of facilitating communication across networks 1210 and/or 1212.

In some embodiments, transportation management vehicle device 1218 may include a provider communication device configured to communicate with users, such as drivers, passengers, pedestrians, and/or other users. In some embodiments, transportation management vehicle device 1218 may communicate directly with transportation management system 1202 or through another provider computing device, such as provider computing device 1216. In some embodiments, a requestor computing device (e.g., device 1224) may communicate via a connection 1226 directly with transportation management vehicle device 1218 via a communication channel and/or connection, such as a peer-to-peer connection, Bluetooth connection, NFC connection, ad hoc wireless network, and/or any other communication channel or connection. Although FIG. 12 shows particular devices communicating with transportation management system 1202 over networks 1210 and 1212, in various embodiments, transportation management system 1202 may expose an interface, such as an application programming interface (API) or service provider interface (SPI) to enable various third parties which may serve as an intermediary between end users and transportation management system 1202.

In some embodiments, devices within a vehicle may be interconnected. For example, any combination of the following may be communicatively connected: vehicle 1214, provider computing device 1216, provider tablet 1220, transportation management vehicle device 1218, requestor computing device 1224, requestor tablet 1222, and any other device (e.g., smart watch, smart tags, etc.). For example, transportation management vehicle device 1218 may be communicatively connected to provider computing device 1216 and/or requestor computing device 1224. Transportation management vehicle device 1218 may establish communicative connections, such as connections 1226 and 1228, to those devices via any suitable communication technology, including, e.g., WLAN technologies implementing the IEEE 1002.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1202 using applications executing on their respective computing devices (e.g., 1216, 1218, 1220, and/or a computing device integrated within vehicle 1214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 13:
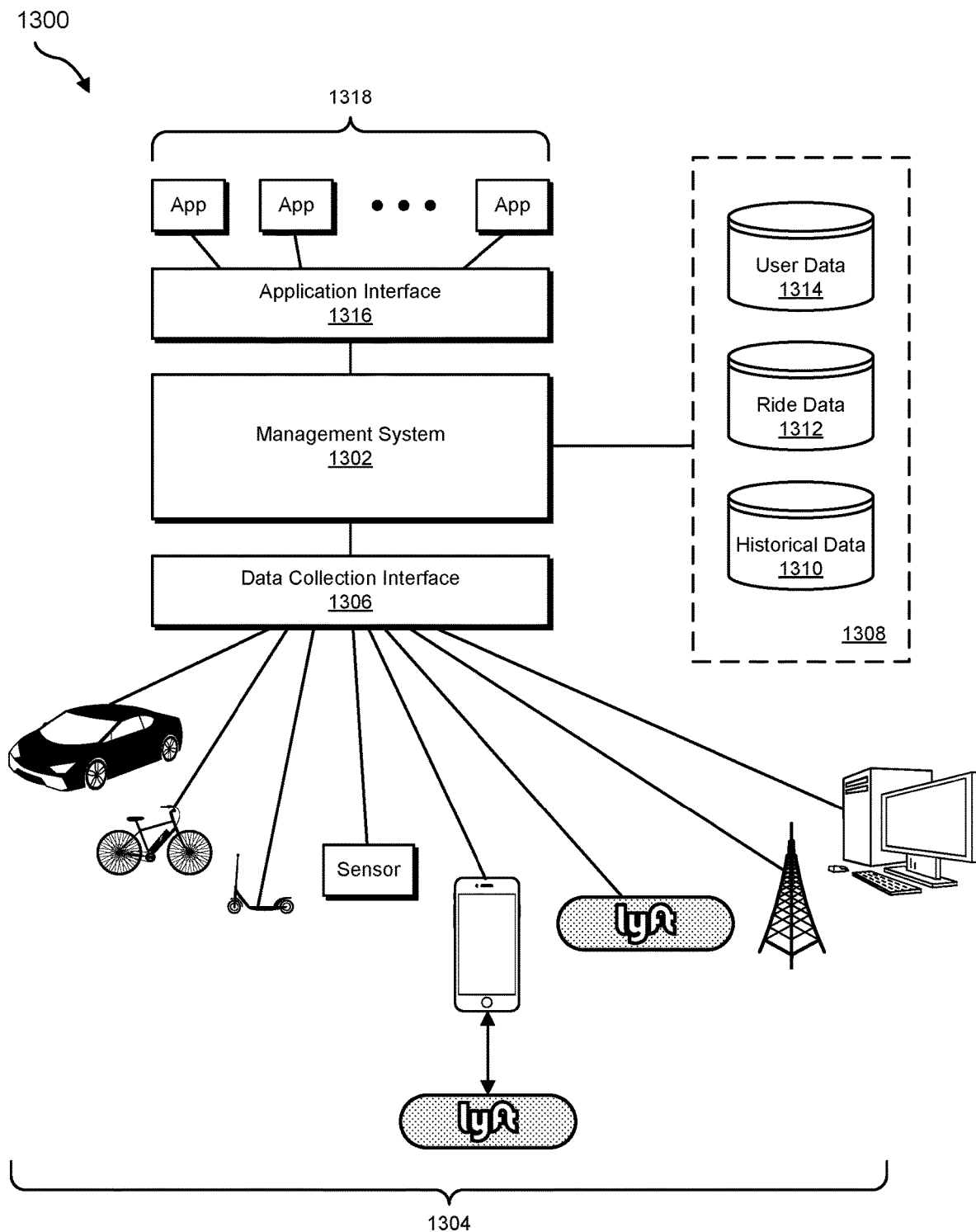
FIG. 13 is an illustration of an example data collection and application management system.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 may be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data store 1308. Data store 1308 may include one or more data stores, such as databases, object storage systems and services, cloud-based storage services, and other data stores. For example, various data stores may be implemented on a non-transitory storage medium accessible to management system 1302, such as historical data store 1310, ride data store 1312, and user data store 1314. Data stores 1308 can be local to management system 1302, or remote and accessible over a network, such as those networks discussed above or a storage-area network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by requestor or provider. User data 1314 may include user account data, preferences, location history, and other user-specific data. Although certain data stores are shown by way of example, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 may run on various user devices (including provider and requestor computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising:
    a front brake and a rear brake of a personal mobility vehicle;
    a first brake lever and a second brake lever that are configured to, in response to receiving input, initiate engagement of the front brake and the rear brake, respectively;
    a weight sensor configured to detect a condition affecting braking of the personal mobility vehicle, wherein the weight sensor is associated with a seating portion of the personal mobility vehicle;
    a controller configured to:
        determine a first brake force to be applied to the front brake and a second brake force to be applied to the rear brake based at least in part on the condition affecting the braking of the personal mobility vehicle, wherein the condition affecting the braking comprises a position and a weight of a rider of the personal mobility vehicle; and
        engage the front brake by applying the first brake force and the rear brake by applying the second brake force, and
    an output mechanism configured to present an indication to the rider of the personal mobility vehicle of which of the first brake lever or the second brake lever to apply to reduce momentum of the personal mobility vehicle, the output mechanism configured to present the indication based at least in part on a predetermined distribution differential between the first brake force and the second brake force, and the output mechanism being further configured to present the indication prior to the engagement of the front brake and the rear brake.

2. The system of claim 1, wherein the controller is configured to determine the first brake force to be applied to the front brake and the second brake force to be applied to the rear brake by determining a distribution differential between the first brake force and the second brake force.

3. The system of claim 1, wherein the controller is further configured to increase the second brake force by:
determining that the weight of the rider of the personal mobility vehicle is distributed toward a front of the personal mobility vehicle; and
increasing the second brake force to be applied to the rear brake of the personal mobility vehicle based at least in part on determining that the weight of the rider is distributed towards the front of the personal mobility vehicle.

4. The system of claim 1, wherein the controller is further configured to increase the first brake force by:
determining that the weight of the rider of the personal mobility vehicle is distributed toward a rear of the personal mobility vehicle; and
increasing the first brake force to be applied to the front brake of the personal mobility vehicle based at least in part on determining that the weight of the rider is distributed towards the rear of the personal mobility vehicle.

5. The system of claim 1, wherein the controller is further configured to increase the second brake force by:
receiving information from a sensor that indicates that a front wheel of the personal mobility vehicle lacks traction; and
increasing the second brake force to be applied to the rear brake based at least in part on receiving the information from the sensor that indicates that the front wheel of the personal mobility vehicle lacks traction.

6. The system of claim 1, wherein the controller is further configured to increase the first brake force by:
receiving information from a sensor that indicates that a rear wheel of the personal mobility vehicle lacks traction; and
increasing the first brake force to be applied to the front brake based at least in part on receiving the information from the sensor that indicates that the rear wheel of the personal mobility vehicle lacks traction.

7. The system of claim 1, wherein the controller is further configured to increase the second brake force by:
receiving information from a sensor that indicates a probability of the personal mobility vehicle tipping over; and
increasing the second brake force to be applied to the rear brake based at least in part on receiving the information from the sensor that indicates the probability of the personal mobility vehicle tipping over.

8. The system of claim 1, wherein:
the front brake comprises a front mechanical brake and a front electrical brake;
the rear brake comprises a rear mechanical brake and a rear electrical brake;
the front mechanical brake and the rear mechanical brake comprise a mechanical brake system;
the front electrical brake and the rear electrical brake comprise an electrical brake system; and wherein the controller is further configured to determine a distribution differential between the mechanical brake system and the electrical brake system.

9. The system of claim 8, further comprising making a determination, by the controller, to engage a regenerative braking portion of the electrical brake system in response to receiving information from a sensor that indicates that the personal mobility vehicle is going downhill.

10. The system of claim 1, wherein the controller is further configured to determine a frequency of application and cessation of application of the first brake force and the second brake force.

11. The system of claim 1, wherein the controller is further configured to determine, based at least in part on data from a sensor, that the condition that affects the braking of the personal mobility vehicle comprises an environmental condition external to the personal mobility vehicle.

12. The system of claim 1, wherein the controller is further configured to determine, based at least in part on data from a sensor, that the condition that affects the braking of the personal mobility vehicle comprises a level of wear of at least one component of the personal mobility vehicle.

13. The system of claim 1, wherein the first brake lever is correlated with the front brake and the second brake lever is correlated with the rear brake and wherein the output mechanism is further configured to provide the indication to the rider of the personal mobility vehicle based on the determination by the controller of the first brake force to be applied to the front brake and the second brake force to be applied to the rear brake.

14. The system of claim 1, wherein engaging the front brake by applying the first brake force and the rear brake by applying the second brake force comprises increasing the first brake force or the second brake force gradually over time as opposed to immediately applying the first brake force or the second brake force.

15. The system of claim 1, wherein the predetermined distribution differential between the front brake and the rear brake comprises a distribution differential of 30% of maximum force for the rear brake and 10% of maximum force for the front brake.

16. A computer-implemented method, comprising, by a personal mobility vehicle including a controller and a front brake and a rear brake that, when engaged, reduce momentum of the personal mobility vehicle:
detecting that one of a first brake lever or a second lever of the personal mobility vehicle has received input;
receiving data from a weight sensor of the personal mobility vehicle, the sensor being configured to detect a condition affecting braking of the personal mobility vehicle, wherein the weight sensor is associated with a seating portion of the personal mobility vehicle;
determining a first brake force to be applied to the front brake and a second brake force to be applied to the rear brake based at least in part on the condition affecting the braking of the personal mobility vehicle, wherein the condition affecting the braking comprises a position and a weight of a rider of the personal mobility vehicle;
presenting, by an output mechanism of the personal mobility vehicle, an indication to the rider of the personal mobility vehicle of which of the first brake lever or the second brake lever to apply to reduce momentum of the personal mobility vehicle, the output mechanism being configured to present the indication based at least in part on a predetermined distribution differential between the first brake force and the second brake force; and engaging, based at least in part on the indication, and in response to detecting the input from the first brake lever or the second lever, the front brake by applying the first brake force and the rear brake by applying the second brake force.

17. The computer-implemented method of claim 16, further comprising:

receiving data from a sensor that indicates a lack of pressure on a rider-supporting portion of the personal mobility vehicle; and disengaging the front brake and the rear brake in response to receiving the data from the sensor that indicates the lack of pressure on the rider-supporting portion of the personal mobility vehicle.

18. The computer-implemented method of claim 16, wherein determining the first brake force to be applied to the front brake and the second brake force to be applied to the rear brake further comprises:

receiving information from a sensor that indicates a probability of the personal mobility vehicle tipping over; and increasing the second brake force to be applied to the rear brake based at least in part on receiving the information from the sensor that indicates the probability of the personal mobility vehicle tipping over.

19. The computer-implemented method of claim 16, wherein:

receiving the data from a sensor comprises receiving data about an object towards which the personal mobility vehicle is moving; and determining the first brake force and the second brake force comprises making a determination to engage the front brake and the rear brake with a specified amount of force in response to receiving the data about the object towards which the personal mobility vehicle is moving.

20. A non-transitory computer-readable medium comprising instructions that, when executed by one or more processors of a controller, cause the controller to:

detect that one of a first brake lever or a second lever of a personal mobility vehicle has received input, wherein personal mobility vehicle includes a front brake and a rear brake that, when engaged, reduce momentum of the personal mobility vehicle;

receive data from a weight sensor of the personal mobility vehicle, the sensor being configured to detect a condition affecting braking of the personal mobility vehicle, wherein the weight sensor is associated with a seating portion of the personal mobility vehicle;

determine a first brake force to be applied to the front brake and a second brake force to be applied to the rear brake based at least in part on the condition affecting the braking of the personal mobility vehicle, wherein the condition affecting the braking comprises a position and a weight of a rider of the personal mobility vehicle;

present, by an output mechanism of the personal mobility vehicle, an indication to the rider of the personal mobility vehicle of which of the first brake lever or the second brake lever to apply to reduce momentum of the personal mobility vehicle, the output mechanism being configured to present the indication based at least in part on a predetermined distribution differential between the first brake force and the second brake force; and engage, based at least in part on the indication, and in response to detecting the input from the first brake lever or the second lever, the front brake by applying the first brake force and the rear brake by applying the second brake force.

* * * * *